(12) United States Patent
Karuppannan et al.

(10) Patent No.: US 11,715,266 B2
(45) Date of Patent: Aug. 1, 2023

(54) METHOD AND SYSTEM FOR ORGANIZING A VIRTUAL SHOWROOM WITH ONE OR MORE 3D IMAGES

(71) Applicant: Infosys Limited, Bangalore (IN)

(72) Inventors: Sekar Karuppannan, Mysore (IN);
Vaibhav Nighojkar, Pune (IN);
Adithya Kuppili, Visakhapatnam (IN);
Yatish Siddagangaiah, Bangalore (IN);
Gaurav Ojha, Bangalore (IN)

(73) Assignee: INFOSYS LIMITED, Bangalore (IN)

(*) Notice: Subject to any disclaimer, the term of this patent is extended or adjusted under 35 U.S.C. 154(b) by 110 days.

(21) Appl. No.: 17/479,675

(22) Filed: Sep. 20, 2021

(65) Prior Publication Data
US 2022/0358723 A1     Nov. 10, 2022

(30) Foreign Application Priority Data

May 10, 2021 (IN) .............................. 202141021142

(51) Int. Cl.
*G06T 19/00* (2011.01)
*G06Q 30/0601* (2023.01)

(52) U.S. Cl.
CPC ....... *G06T 19/003* (2013.01); *G06Q 30/0643* (2013.01); *G06T 2210/16* (2013.01)

(58) Field of Classification Search
CPC ... G06T 19/003; G06T 2210/16; G06T 19/00; G06Q 30/0643
See application file for complete search history.

(56) References Cited

U.S. PATENT DOCUMENTS

| | | | |
|---|---|---|---|
| 7,917,397 B1 | 3/2011 | Giannini et al. | |
| 10,687,573 B2 | 6/2020 | Schultz et al. | |
| 2012/0188232 A1* | 7/2012 | Saldanha | G06T 17/00 |
| | | | 345/419 |
| 2020/0193678 A1* | 6/2020 | Wiedmeyer | G06T 17/20 |
| 2021/0224888 A1* | 7/2021 | Kurz | G06F 3/0481 |
| 2022/0258049 A1* | 8/2022 | Kanani | A63F 13/53 |

FOREIGN PATENT DOCUMENTS

| | | | | |
|---|---|---|---|---|
| EP | 2164049 A1 * | 3/2010 | ............. | D04B 37/02 |
| WO | 2019169054 A1 | 9/2019 | | |

OTHER PUBLICATIONS

Li, "Model-Driven Feedforward Prediction for Manipulation of Deformable Objects", IEEE Transactions on Automation Science and Engineering, vol. 15, No. 4, Oct. 2018 . (Year: 2018).*
"Ghost Mannequin Photography: How to get 3D product images", Pixelz Blog, https://www.pixelz.com/blog/invisible-ghost-mannequin-photography/, last accessed Sep. 16, 2021.
Danerek, R. et al., DeepGarment: 3D Garment Shape Estimation from a Single Image, Computer Graphics Forum, 2017.
"Creating 3D models for merchants", https://help.shopify.com/en/partners/resources/creating-media/3d-models/creating-3d-models, last accessed Sep. 16, 2021.

* cited by examiner

*Primary Examiner* — Maurice L. McDowell, Jr.
(74) *Attorney, Agent, or Firm* — Troutman Pepper Hamilton Sanders LLP (Rochester)

(57) ABSTRACT

Provided is method and system for organizing a virtual showroom with one or more 3d images. Scripts are generated from the input images provided by the user, for generating 3D images of the products in the showroom. The generated 3D images can be in folded form, hanger display or mannequin.

15 Claims, 4 Drawing Sheets

401

402

403

(PRIOR-ART)

METHOD AND SYSTEM FOR ORGANIZING A VIRTUAL SHOWROOM WITH ONE OR MORE 3D IMAGES

This application claims the benefit of Indian Patent Application Serial No. 202141021142 filed May 10, 2021, which is hereby incorporated by reference in its entirety.

FIELD

This technology generally relates to organizing a virtual showroom, more particularly, to methods for organizing a virtual showroom with one or more 3d images.

BACKGROUND

As more and more brands move towards virtual showrooms, setting up and organizing the same is a challenge, for B2B as well as B2C environments. The assets to be displayed need to be set up in various forms. Presently this needs to be done in CAD application for individual assets and that takes a lot time to convert multiple assets into required forms, with in short span of time.

SUMMARY

Provided is a method for organizing a virtual showroom with one or more 3D images, comprising creating a dataset with one or more 2D and 3D images of one or more textile product and textile material for displaying in the virtual showroom. For each image in the created dataset, a 3D image is created of one or more of, a display on mannequin, a display on hangers; and a folded display. Particular embodiments comprise providing an image of each folding step of the textile product and the textile material; and automatically generating a script for generating the 3D image of the folded display based on the provided image of each folding step.

Provided is a system for organizing a virtual showroom with one or more 3D images, comprising one or more hardware processors; and a storage device coupled to the one or more hardware processors, with instructions stored thereon that, when executed by the one or more hardware processors, cause the one or more hardware processors to perform operations comprising creating a dataset with one or more 2D and 3D images of one or more textile product and textile material for displaying in the virtual showroom. For each image in the created dataset, a 3D image is created of one or more of, a display on mannequin, a display on hangers; and a folded display. Particular embodiments comprise providing an image of each folding step of the textile product and the textile material; and automatically generating a script for generating the 3D image of the folded display based on the provided image of each folding step.

Provided is a non-transitory computer readable medium with instructions stored thereon that, when executed by a processor, cause the processor to perform operations comprising creating a dataset with one or more 2D and 3D images of one or more textile product and textile material for displaying in the virtual showroom. For each image in the created dataset, a 3D image is created of one or more of, a display on mannequin, a display on hangers; and a folded display. Particular embodiments comprise providing an image of each folding step of the textile product and the textile material; and automatically generating a script for generating the 3D image of the folded display based on the provided image of each folding step.

DETAILED DESCRIPTION

While the particular embodiments described herein may illustrate the disclosure in a particular domain, the broad principles behind these embodiments could be applied in other fields of endeavor. To facilitate a clear understanding of the present disclosure, illustrative examples are provided herein which describe certain aspects of the disclosure. However, it is to be appreciated that these illustrations are not meant to limit the scope of the disclosure, and are provided herein to illustrate certain concepts associated with the disclosure.

It is also to be understood that the present disclosure may be implemented in various forms of hardware, software, firmware, special purpose processors, or a combination thereof. Preferably, the present disclosure is implemented in software as a program tangibly embodied on a program storage device. The technology may be uploaded to, and executed by, a machine comprising any suitable architecture.

Figure 1:
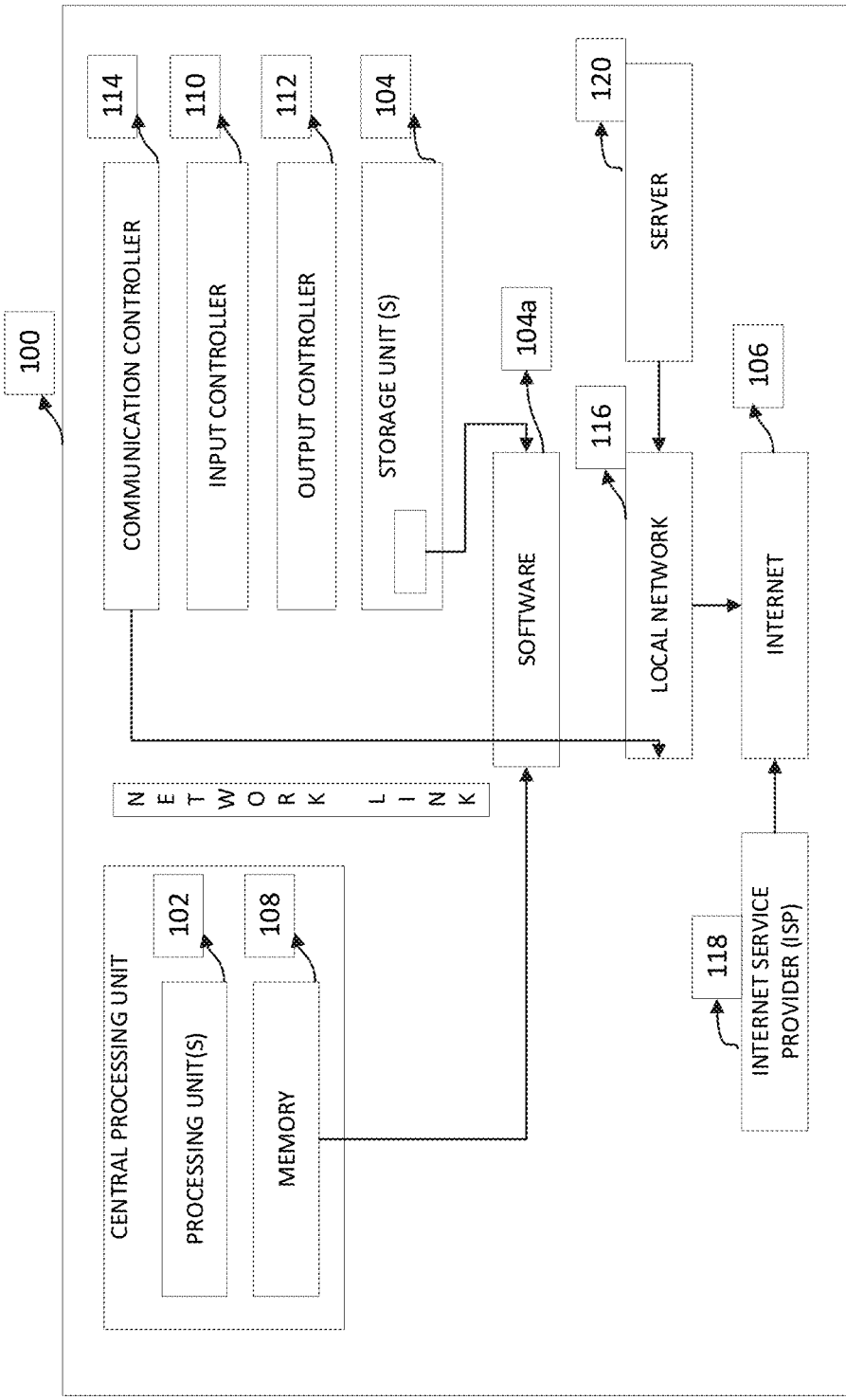
FIG. 1 is an exemplary network environment which implements method & system for organizing a virtual showroom with one or more 3D images.

FIG. 1 is a block diagram of a computing device 100 to which the present disclosure may be applied according to an embodiment of the present disclosure. The computing machine maybe configured for performing the process of predictive maintenance of a machine as explained herewith. The computing device and the machine may connected together by the Local Area Network (LAN) and Wide Area Network (WAN) including other types and numbers of devices, components, elements and communication networks in other topologies and deployments. While not shown, additional components, such as routers, switches and other devices which are well known to those of ordinary skill in the art may also be used and thus will not be described here. This technology provides several advantages including providing more effective methods, non-transitory computer readable medium and devices for predictive maintenance. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid-state storage device and a non-transitory storage device. The storage device 104 may contain software 104a which is a set of instructions (i.e. code). Alternatively, instructions may be stored in one or more remote storage devices, for example storage devices accessed over a network or the interne 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Although an exemplary computing environment is described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

In one embodiment, the present disclosure provides a process for managing virtual showrooms and arranging display of products and fixtures in the showrooms. In an embodiment, the products may be any garment or textile item. The garments may be displayed in any form. In an embodiment the garments may be displayed in folded form. In another embodiment, garment may be show cased on a mannequin. These garments maybe wearable apparels, and user may prefer mannequin display. In another embodiment, garments maybe displayed on a hanger.

In an embodiment, the products may be garments that include ready apparels, footwears, wearable accessories, blankets, sheets, and any other garment or textile or such things which can folded or put on hanger or put on mannequin. They may be household products also e.g. tents, trekking backpacks etc. It maybe any texture or material product e.g. cotton, leather etc.

Figure 2:
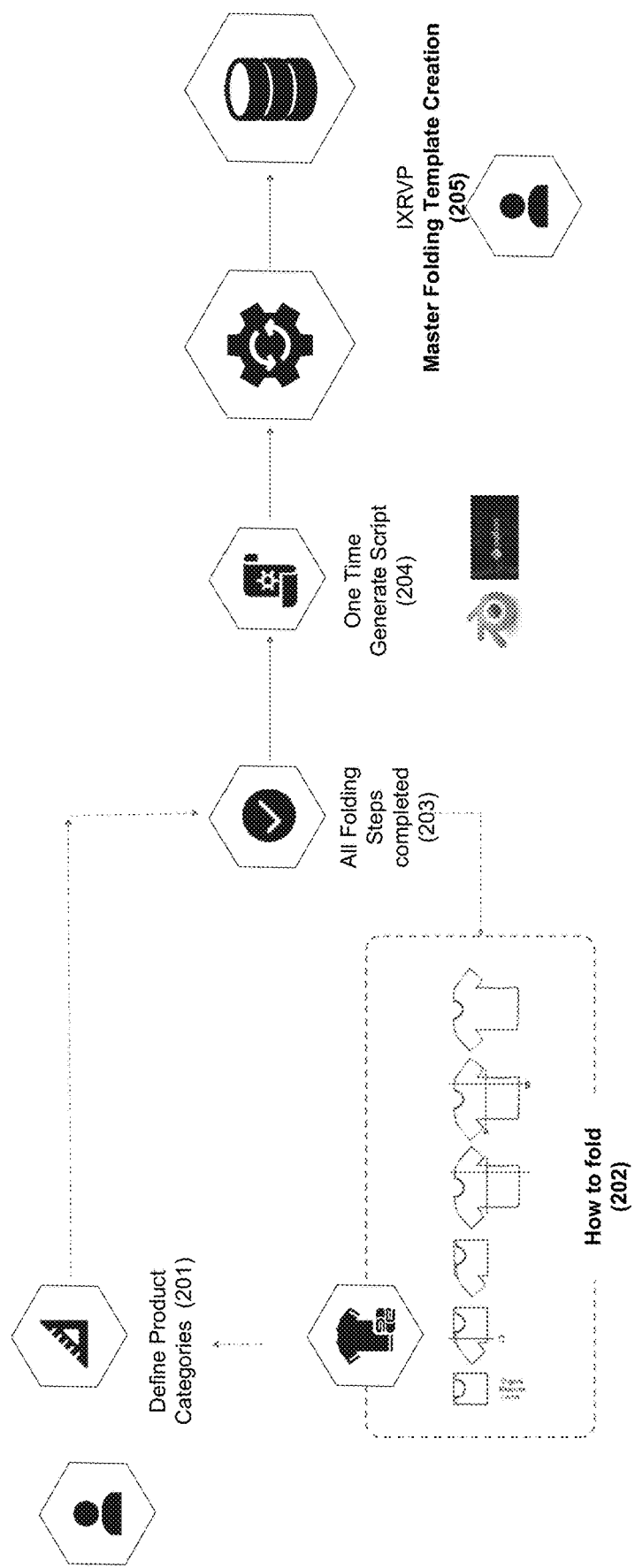
FIG. 2 is a flowchart of an exemplary method for organizing a virtual showroom.

An exemplary method for organizing a virtual showroom will now explained along with description of FIG. 2.

In one embodiment, a dataset maybe created with multiple images of the products which need to be displayed. As mentioned above, any type of product can be displayed, and their images maybe stored in the dataset. In an embodiment 2D images maybe saved. In another embodiment 3D images may also be saved. Or it may be both type of images. Product categories maybe defined for the type of products. And for each product, different sizes and designs can also be categorized (201).

For each product type or design entered in the dataset, a 3D image maybe created for each folding steps of that product (202). A separate image for each folding step maybe entered in the system, which may define the step by step folding process. For the purpose of explanation, if we consider a jacket, there can be separate images of folding one arm of the jacket, next image of folding another arm, next image of folding the hoodie, and then folding the jacket etc. Along with the images for folding the dimensions for folding can also be entered. This may vary for different texture and different sizes of the jacket.

Once the above images are uploaded, the folding process is completed (203), the system is ready for use. As the folding pics get uploaded, the system may initiate automatic creation of scripts (204) for converting the 3D images in the dataset to final folded pics. The script generation may be done at run time, or it may be done at preconfigured periodic times. Once the system executes the scripts the folded images of various products gets generated. For each type of product or apparel, the corresponding folded image in a template maybe created (205). The showroom owners may use the template to create and organize their virtual showrooms. For creating the showroom, the owner may select the products, their colors, size and other related parameters, and also the quantity. Once the selection is done, the system may provide the appropriate images at the required position in the virtual showroom.

In an embodiment, the showroom may also display the products in an augmented reality (AR) mode. In another embodiment, the showroom may be configured to display in virtual reality (VR) mode. Suitable technologies may be leveraged to implement the AR/VR functionalities for the virtual showroom. The present system may provide access directly into diverse XR device runtimes across multiple platforms. It may also enable appropriate applications and engines to run on any system that exposes the required APIs. In an embodiment, USDz file format and other related formats may be supported for AR.

Figure 3:
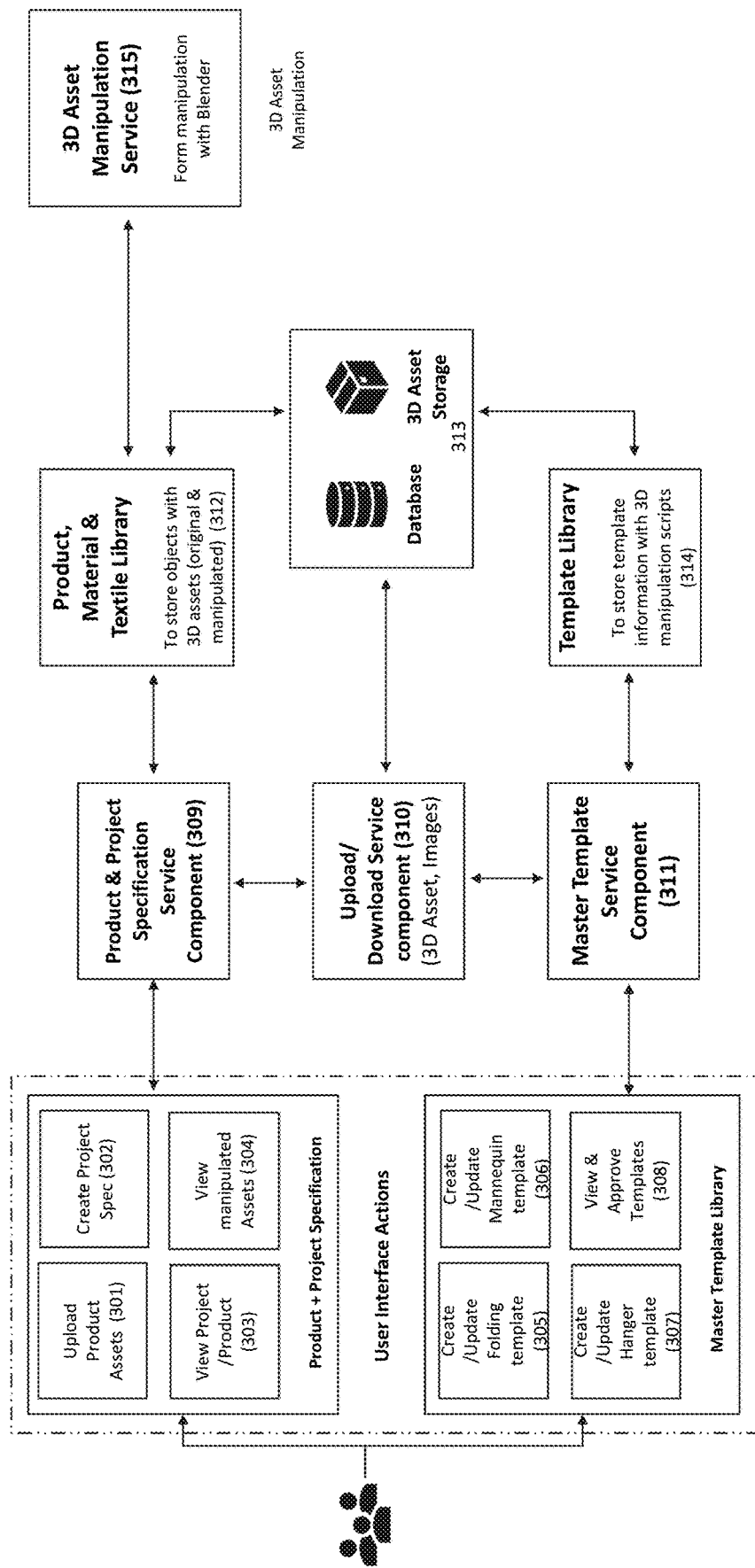
FIG. 3 is a detailed data flow of an exemplary method for arranging various products in a virtual showroom.

The process and data flow to implement the present disclosure will be now explained with further details using FIG. 3. In an embodiment, an admin user of the disclosed system may be a showroom owner. The admin user may also be a designer or a manufacturer or a sales team and other related stakeholders who may be showcasing the products and manipulated forms to any interested entity. The admin user may initially upload the products' 3D design file in a system dataset (301). The admin user may also use 2D images for other related processes. The products may be uploaded as a 3D file. The 3D files may relate to any ready product, or the textile material in any available texture. In an embodiment, products may be any domestic, industrial or wearables. This may also include apparel or footwear product. It may include any other product which can be displayed in a showroom. Some examples maybe tents, sheets, garments, workshop dresses, fabrics, leather and other materials etc. These may vary based on industry requirements and user configurations, which can be displayed and manipulated based on requirements, using the present disclosed technology.

As part of an initial setup of the virtual showroom, the admin user may define or configure various settings or projects in the system. The system may need configuration as per the requirements of the virtual showroom or the type of products to be displayed (302). According to the type of products and features of the product and the type of display and virtual showroom to be created, the showroom creates project and product specifications component (309) in the system. These specifications may allow the users to view the product's 3D images on the User Interface and define how the 3D images are manipulated into folded, hanger or mannequin forms (303, 304). Project specification may also allow the users to define the manipulation template(s) for each product 3D image.

In an embodiment, the Product & Project Specification Service component (309) may provide the functionalities to the user to create projects, upload products and manipulate the 3D images (301, 302, 303, 304). The product & project specification service maybe the backend component and provides communication between a frontend via user actions, asset and data storage layer (313) and the 3D Asset Manipulation Service (315).

Upload/Download Service component (310) may provide the functionality to upload and download files 3D images or assets to and from the application. In one embodiment Product & Project Specification service (309) & Master Template Service Component (311) communicate with Upload/Download Service for any file upload/download activities. The Product, Material & Textile Library (312) provides the functionality to organize and store the Product, Material & Textile components.

In one embodiment Master Template Service Component (311) may provide functionalities to the user to create, view and approve templates for folding, hanging and mannequin type manipulation. (305, 306, 307, 308). This service is the backend component and provides communication between UI frontend user actions, asset and data storage layer (313)

Based on the specifications, product details and type showroom requirements, the user may create preconfigured templates for each type of 3D manipulation requirements (305, 306, 307). The created templates can be approved within the application by the user (308). While using the system and defining a project specification, a user may select a template according to which the uploaded 3D image of the product will be manipulated and made available for the showroom. In one embodiment a template may consist of steps for folding a type of product or steps to hang a product on a type of hanger or steps to drape a product on a type of mannequin. The Template Library (314) provides the functionality to organize and store the master template components.

In an embodiment the templates created for manipulating the 3D product images and setting up the virtual showroom maybe stored in a template library (314). The user can select a template from this library for each product while creating a project specification. The products' 3D image may be manipulated as per the instructions or steps defined in the templates.

In one embodiment, the 3D assets and related metadata maybe stored in the storage layer (313). This layer may comprises of a database. In an embodiment it many comprise of a NOSQL database for metadata and Object Storage for 3D Assets.

3D Asset Manipulation Service (315) may provide the functionality to manipulate 3D assets. This service provides communication between the storage layer and a 3D pipeline, which can be created using any available tool or platform. As and when a new Product is added to the application, 3D asset manipulation service executes the 3D manipulation using 3D pipeline Blender for that product. The manipulation is done according to the template that was selected for the Product while creating the Project Specification.

In one embodiment, the system may have templates for folded display, hanger display, mannequin display and any other type of desired display form.

The application may be deployed on cloud and may be made available as SaaS offering as well as on private cloud. The application may be accessible from within a user's network. The showroom to be organized may be available to the customers online through any configurable means, as per the users requirements. This may also be implemented for manufacturers and designing organizations. The input can be provided over a network means, using a remote interface. The outputs can also be provided to the users and admins at remote location or onsite via networking means. Appropriate interface can be used by admin users to access the system at required remote locations or onsite.

Figure 4:
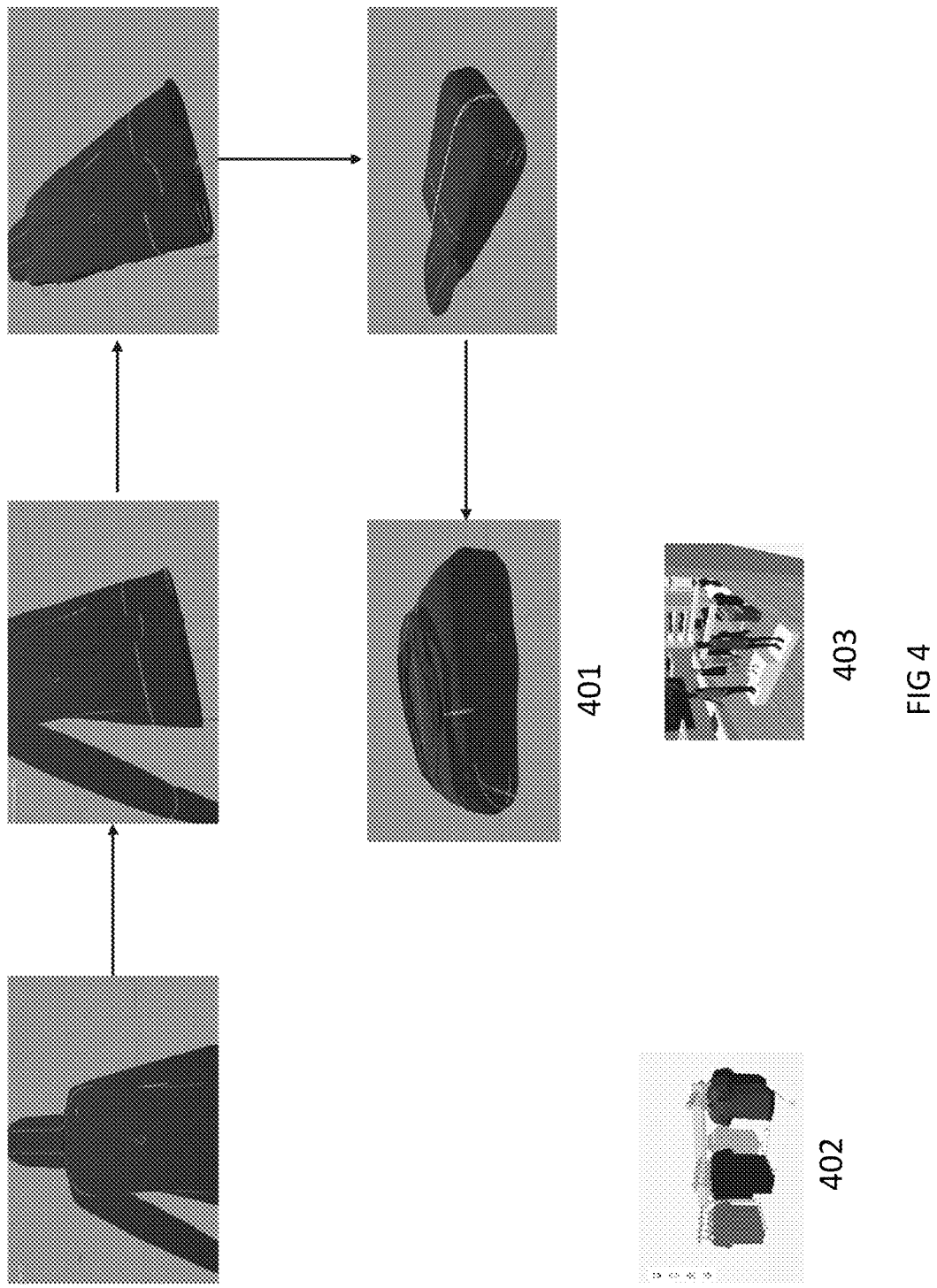
FIG. 4 is an example for explaining the display the product in folded form.

FIG. 4 provides an example describing creating the 3D image of a product in folded form. For the purpose of this explanation, a hoodie jacket may be considered. At the initial setup of the system the showroom owner identifies the various types of hoodie jacket that have to displayed in the virtual showroom. For each hoodie type selected, the showroom owner enters images describing the folding of the hoodie, as shown in the FIG. 4. The final folded pic (401) is needed for the showroom. Once the folding process images are uploaded, the system automatically generates scripts for creating images of the hoodie in folded form. The folded image for each selected type of hoodie is used in the showroom. If the showroom owner needs, mannequin form (403), and hanger display (402) of the selected product is also generated. The showroom owner can then use these images for setting up the showroom.

This technology provides a number of advantages including providing more effective methods, non-transitory computer readable medium, and system for organizing a virtual showroom. Additionally, with this technology 3D images of the product can be created in the desired form, and can be displayed to the clients or customers. In a B2B environment, the referred clients may the manufacturers or franchise owners etc. for displaying the products. In B2C environment, the present disclosure may be used to organize a virtual showroom for buyers.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for organizing a virtual showroom with one or more 3D images, the method comprising:
   creating, by a computing device, a dataset with one or more 2D or 3D images of at least one textile product or textile material for display in the virtual showroom;
   wherein for the one or more 2D or 3D images in the created dataset, the creating further comprises creating an additional 3D image of the textile product or textile material on or in one or more of:
   a display on mannequin;
   a display on a hanger; or
   a folded display, wherein the creating the additional 3D image of the folded display further comprises:
   providing, by the computing device a folding step image of each folding step of the textile product or the textile material; and
   automatically generating a script for generating the additional 3D image of the folded display based on the provided image of each folding step.

2. The method as claimed in claim 1, wherein the dataset comprises the one or more 2D or 3D images of the textile product or textile material, having predecided parameter values.

3. The method as claimed in claim 1, wherein the creating an additional 3D image of the textile product or textile material on the display on the mannequin further comprises automatically generating, by the computing device, scripts for converting the 3D images into the 3D image of the display on mannequins.

4. The method as claimed in claim 1, wherein the creating an additional 3D image of the textile product or textile material on the display on the hanger further comprises automatically generating, by the computing device, scripts for converting the additional 3D image into a hanger 3D image of the display on the hanger.

5. The method as claimed in claim 1, wherein the creating the additional 3D image further comprises creating the additional 3D image for visualizing in augmented reality mode and a virtual reality mode.

6. A system for organizing a virtual showroom with one or more 3D images, the system comprising:
   one or more hardware processors; and
   a storage device coupled to the one or more hardware processors, with instructions stored thereon that, when executed by the one or more hardware processors, cause the one or more hardware processors to perform operations comprising:
   creating a dataset with one or more 2D and 3D images of at least one textile product or textile material for display in the virtual showroom;
   wherein for the one or more 2D or 3D images in the created dataset, the creating further comprises creating an additional 3D image of the textile product or textile material on or in one or more of:
   a display on mannequin;
   a display on a hanger; or
   a folded display;
   wherein the creating the additional 3D image of the folded display further comprises:
   providing a folding step image of each folding step of the textile product or the textile material; and
   automatically generating a script for generating the additional 3D image of the folded display based on the provided image of each folding step.

7. The system as claimed in claim 6, wherein the dataset comprises the one or more 2D or 3D images of the textile product or textile material, having predecided parameter values.

8. The system as claimed in claim 6, wherein the creating an additional 3D image of the textile product or textile material on the display on the mannequin further comprises automatically generating scripts for converting the 3D images into the 3D image of the display on mannequins.

9. The system as claimed in claim 6, wherein the creating an additional 3D image of the textile product or textile material on the display on the hanger further comprises automatically generating scripts for converting the additional 3D image into a hanger 3D image of the display on the hanger.

10. The system as claimed in claim 6, wherein the creating the additional 3D image further comprises creating the additional 3D image for visualizing in augmented reality mode and a virtual reality mode.

11. A non-transitory computer readable medium with instructions stored thereon that, when executed by a processor, cause the processor to perform operations comprising:
    creating a dataset with one or more 2D and 3D images of at least one textile product or textile material for display in the virtual showroom;
    wherein for the one or more 2D or 3D images in the created dataset, the creating further comprises creating an additional 3D image of the textile product or textile material on or in one or more of:
    a display on mannequin;
    a display on a hanger; or
    a folded display;
    wherein the creating the additional 3D image of the folded display further comprises:
    providing a folding step image of each folding step of the textile product or the textile material; and
    automatically generating a script for generating the additional 3D image of the folded display based on the provided image of each folding step.

12. The computer readable medium as claimed in claim 11, wherein the dataset comprises the one or more 2D or 3D images of the textile product or textile material, having predecided parameter values.

13. The computer readable medium as claimed in claim 11, wherein the creating an additional 3D image of the textile product or textile material on the display on the mannequin further comprises automatically generating scripts for converting the 3D images into the 3D image of the display on mannequins.

14. The computer readable medium as claimed in claim 11, wherein the creating an additional 3D image of the textile product or textile material on the display on the hanger further comprises automatically generating scripts for converting the additional 3D image into a hanger 3D image of the display on the hanger.

15. The computer readable medium as claimed in claim 11, wherein the creating the additional 3D image further comprises creating the additional 3D image for visualizing in augmented reality mode and a virtual reality mode.

\* \* \* \* \*